Dec. 2, 1969  E. J. POWELL  3,481,328
HYDROPNEUMATIC MASSAGING APPARATUS
Filed May 16, 1967
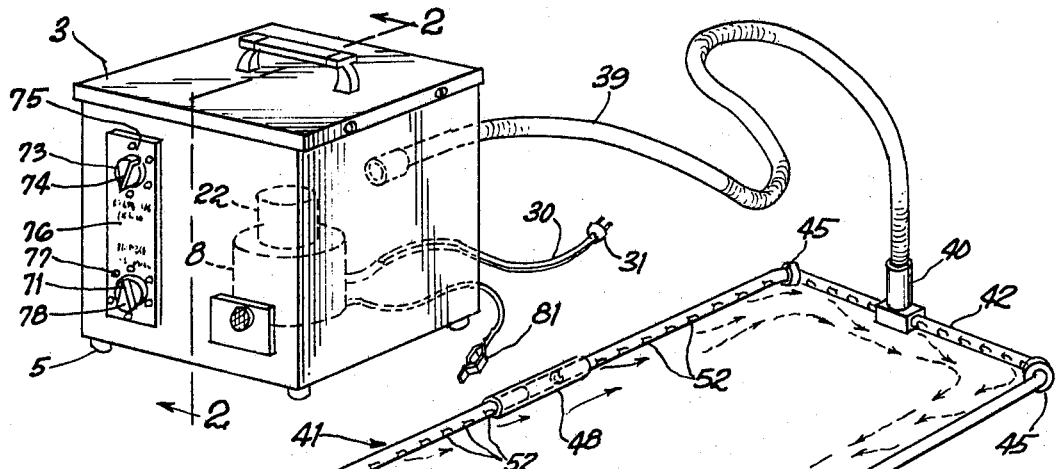
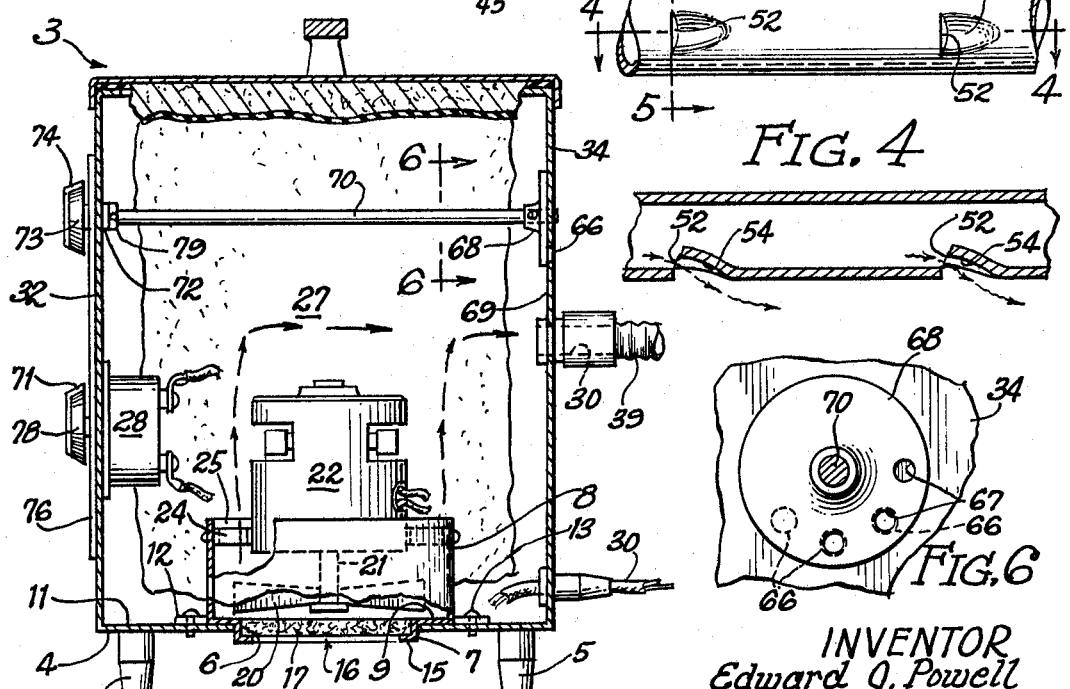
INVENTOR
Edward J. Powell
by Leonard S. Knox
Attorney _United States Patent Office_

3,481,328
Patented Dec. 2, 1969

3,481,328
HYDROPNEUMATIC MASSAGING APPARATUS
Edward J. Powell, 5451 N. Long Ave.,
Chicago, Ill. 60630
Filed May 16, 1967, Ser. No. 638,880
Int. Cl. A61h 9/00
U.S. Cl. 128—66             5 Claims

ABSTRACT OF THE DISCLOSURE

Apparatus for inducing flow of air under pressure into water in which an individual is immersed, e.g. as in bathing, particularly characterized by the provision of a manifold to be located in the water, the manifold having a plurality of orifices of a form and disposition to impart a swirling motion to the water whereby massage action is achieved. A secondary aspect concerns the apparatus for providing the air so constructed as to supplement the swirling motion with pulsation of the air supply.

---

This invention relates to therapeutic apparatus for effecting body massage while the individual is immersed in water, such as in a bath tub.

Apparatus of this type known to me leave much to be desired in effecting effective and soothing body massage since the primary desideratum is to impart a whirlpool motion to the body of water, and prior apparatus simply bubbled air vertically therethrough. Thus the stroking action so important in body massage was not attained to an optimum degree. During use the person's body is almost completely immersed so that simple bubbling has only a superficial effect on the body whereas a whirlpool action will rotate the mass of water to provide massage in the real sense.

The principal object of this invention is to provide apparatus including a source of air under pressure and a manifold to be positioned in a bath tub or the like and to which air is fed, the manifold being provided with a plurality of spaced orifices having a configuration such that, as the air issues therefrom, a whirlpool action is imparted to the body of water.

A further object is to provide air supply means adapted to inject air into a body of water to obtain a pulsating body massaging effect on a person immersed in the water.

Another object is to provide control means for adjusting the volume of air and/or the pulsations thereof.

Other objects and advantages inherent in the invention will become apparent from the description and the accompanying drawings, in which latter:

FIG. 1 is a perspective view of the invention apparatus;
FIG. 2 is a vertical cross-sectional view taken substantially on the line 2—2 of FIG. 1;
FIG. 3 is an enlarged fragmentary elevational view of a portion of the manifold;
FIG. 4 is a longitudinal cross section of the portion of the manifold shown in FIG. 3;
FIG. 5 is a cross section taken on the line 5—5 of FIG. 3; and
FIG. 6 is a cross section taken on the line 6—6 of FIG. 2.

Regarded in its broad aspect the invention comprises a source of air under pressure, a manifold to be immersed in the water contained in a bath tub or the like and a conduit to feed the air to the manifold. The manifold is in the form of a loop, desirably rectangular, and is of such dimensions as not to interfere with, or cause discomfort to the individual, and is desirably rendered adjustable in order to fit properly at the bottom of the tub. The manifold is provided with a plurality of orifices spaced apart along the perimetrical extent thereof, and these are located on the side or sides thereof in order that the jets of air issuing therethough have their principal direction in a horizontal plane. Further, to insure whirlpool circulation of the body of water the plane of each orifice is located transversely, i.e. at an angle of substantially 90°, to the principal axis of the manifold whereby the jets interact with the water to induce flow thereof substantially in the direction of said axis. Thus a current is produced with a direction corresponding to the general contour of the body of the user seated within the loop to provide a stroking action.

Now referring to the drawings, there is shown, by way of example, means for supplying air under pressure comprising a housing 3 having a bottom wall 4 provided with a plurality of supporting feet 5. The wall 4 is centrally apertured at 6 to receive an annular member 7 at the lower end of a shroud 8 which is joined along its lower edge an inturned flange 9 to the upper edge of the member 7, the flange 9 providing a seat on the inner surface 11 of the bottom wall 4. A plurality of lugs 12 are struck from the flange 9 outwardly of the shroud to receive rivets 13 securing the shroud to the wall 4.

The member 7 is formed along its lower edge with an inturned flange 15 which defines an air inlet 16. The flange 15 affords support for a filter element 17 which fits complementarily within the member 7 across the inlet 16. The element 17 may be of any common type, such as glass wool batting or polyurethane foam in which the porosities are interconnected.

The shroud 8 encompasses an air pump, e.g. an impeller or fan 20 which is mounted for rotation on the shaft 21 of an electric motor 22 conveniently mounted on the shroud 8 by means of stand-off spacers 24. The motor housing and shroud 8 define an air passage 25 via which air drawn in by the impeller may pass into the space 27 within the housing 3. The period of operation of the motor may be regulated by a timer 28 suitably connected in a series circuit with the motor and a line cord 30 provided with a plug 31 for connection to a conventional receptacle. A suitable grounding clamp 81 is provided for attachment to a suitable ground such as a water faucet.

The chamber 27 has an air outlet at 38 connected to a flexible hose 39 which is connected to a nipple 40 of a manifold 41.

This manifold comprises a pair of U-shaped tubular halves 42, 43, the legs of each U being received telescopically in nipples 48—48 whereby the two halves comprising the manifold may be adjusted to accommodate for varying lengths of bath tub. Screws 47 may be utilized to fix a selected adjustment. It will be understood that the space defined within the manifold is such as to permit the user to be seated therewithin without discomfort. To prevent inadvertent shifting of the manifold friction rings or feet 45 are provided at the four corners. The inwardly facing sides of the U-shaped parts 42 and 43 are provided with a plurality of spaced-apart orifices 52 within the boundary of the tubing.

Each orifice 52, best seen in FIGS. 3, 4, and 5, is preferably formed by striking a lip in the wall of the tubing by a suitably formed punch. The shape of the punch is so selected, e.g. a semi-paraboloid, that a guide channel 54 is associated with each orifice. Thus the jet of air issuing from each orifice is constrained in a specific direction, i.e. toward the right, as shown in FIGS. 3 and 4. Since all of the jets are directed in the same direction, regarded perimetrically of the manifold, each contributes a driving force to the body of water in the same direction so that the water is caused to move past the person's body in the manner of a whirlpool. Accordingly, the individual is subjected to an idealized gentle massaging or stroking action having recognized beneficial therapeutic effects.

By forming the orifices 52 and guiding surfaces 54 by indenting the tubing of the manifold in the manner described, the desired result is achieved without the use of protrusions, such as vanes, tubes and the like which would represent possible injury to the individual.

Inasmuch as a constant speed motor 22 is the most economical, flow of air through the conduit 39 is controlled by bleeding air from the chamber 27. To this end control means is provided in the form of a series of ports 66, in this case three in number, in the back wall 34 of the housing. These ports are selectively alignable with apertures 67 in a valve plate 68 which abuts the interior 69 of wall 34 and is mounted for rotation on a shaft 70 journaled on the rear and front walls 34, 32 of the housing. The shaft 70 is provided with a setting knob 73 having an index 74 co-operable with a series of indicia 75 on a panel 76 mounted on the front wall 32. Said panel also bears indicia 77 cooperative with an index 71 on a knob 78 of the timer. The valve plate 68 is biased against the interior of the rear wall of the housing by a collar 79 on the shaft 70 bearing on a bushing 72 set into the wall 32.

Thus, in order to control the volume of bleed air, the user selects the setting of the ports 66 and apertures 67 to exhaust more or less air from the chamber to atmosphere. If the valve means is fully open a gentler action occurs in the water surrounding the person and when the valve means is fully closed a vigorous action ensues.

I claim:

1. Apparatus for use in conjunction with a mass of water in which an individual is immersed to provide swirling, whirlpool-like movement to the water for massage of the individual's body comprising a source of compressed air, a loop of tubing disposed in the water, said loop defining an enclosed area receiving the individual, means providing communication between said source and loop, said loop having a plurality of perimetrically-spaced orifices on the inner side thereof, each orifice being in a plane transverse to the longitudinal axis of the loop for exhaust of air as a plurality of horizontally-directed jets impinging on the water in the same direction throughout the longitudinal extent of the loop to impart whirlpool motion to the water.

2. The combination in accordance with claim 1 in which the tubing has a deformable wall and each orifice is defined by a lip struck into the wall, said lip conforming substantially to a semi-paraboloid, the base of which corresponds to shearing of the wall inwardly.

3. Apparatus for therapeutic treatment of the human body by hydropneumatic massaging action thereof while the body is immersed in water in a receptacle having a bottom and side walls comprising: a source of air under pressure, a loop of tubing to be supported on said bottom, said loop defining an enclosed area to accept the seated body of the user and conforming substantially to the orientation of the side walls, means connecting said loop to said source, said loop having a plurality of spaced apertures on its inner perimeter and within the outer boundary of the tubing, said apertures being so constructed and arranged as to direct air discharged therethrough as a plurality of horizontally-directed jets impinging on the water in the same direction throughout the longitudinal extent of the loop to impart whirlpool motion to the water.

4. The combination in accordance with claim 3 in which each aperture is defined in part by an inwardly deformed portion of the wall of the tubing, a part of said portion defining a part of the margin of the aperture and the tubing wall constituting the remainder of said margin.

5. The combination in accordance with claim 1 wherein each said orifice is defined by a deformed area of the wall of the tubing, said area corresponding substantially to one-half of the lateral surface of a paraboloid, the orifice per se being bounded by the exterior face of said lateral surface on one side and the interior surface of the tubing on the other side.

References Cited

UNITED STATES PATENTS

| | | | |
|---|---|---|---|
| 3,043,296 | 7/1962 | Gregory | 128—66 |
| 3,138,153 | 6/1964 | Osborn et al. | 128—66 |

LAWRENCE W. TRAPP, Primary Examiner

U.S. Cl. X.R.

4—180